(12) United States Patent
Patel et al.

(10) Patent No.: US 8,380,008 B2
(45) Date of Patent: Feb. 19, 2013

(54) AUTOMATIC IMAGE CROPPING

(75) Inventors: Harita Jayendra Patel, Cupertino, CA (US); Daniel Lipton, Belmont, CA (US)

(73) Assignee: Apple Inc., Cupertino, CA (US)

( * ) Notice: Subject to any disclaimer, the term of this patent is extended or adjusted under 35 U.S.C. 154(b) by 1272 days.

(21) Appl. No.: 12/149,503

(22) Filed: May 2, 2008

(65) Prior Publication Data

US 2009/0274393 A1 Nov. 5, 2009

(51) Int. Cl.
G06K 9/32 (2006.01)
G06K 9/34 (2006.01)
G06K 9/40 (2006.01)
H04N 7/01 (2006.01)
H04N 11/20 (2006.01)
G09G 5/00 (2006.01)

(52) U.S. Cl. ........ 382/298; 382/299; 382/300; 348/441; 348/446; 348/448; 345/660

(58) Field of Classification Search .................. 382/298, 382/299, 300; 345/660; 348/580, 441, 446, 348/448

See application file for complete search history.

(56) References Cited

U.S. PATENT DOCUMENTS

| 6,118,486 A * | 9/2000 | Reitmeier ............... 348/441 |
| 6,411,302 B1 * | 6/2002 | Chiraz .................... 345/545 |
| 6,934,423 B1 * | 8/2005 | Clapper .................. 382/300 |
| 7,760,956 B2 * | 7/2010 | Lin et al. ................ 382/254 |
| 7,777,812 B2 * | 8/2010 | Sun ........................ 348/448 |
| 2004/0141001 A1 * | 7/2004 | Van Der Heyden ...... 345/723 |
| 2005/0276477 A1 * | 12/2005 | Lin et al. ................. 382/173 |

* cited by examiner

Primary Examiner — Matthew Bella
Assistant Examiner — Jose M Torres
(74) Attorney, Agent, or Firm — Kenyon & Kenyon LLP

(57) ABSTRACT

Upon enabling an automatic cropping feature, a computer-implemented method for cropping a plurality of images retrieves a number of images to process among the plurality of images, and selects an image from the plurality of images to determine a set of crop values for the image until the set of crop values for each image have been determined. Determining a set of crop values for an image includes scanning the image from a first side to an opposing side to determine for each scan line of the image an amount representing a degree of color variation among the pixels for that scan line. The amount determined for each scan line is then compared to a threshold value until a crop value for a first area of the image can be determined.

20 Claims, 3 Drawing Sheets

AUTOMATIC IMAGE CROPPING

TECHNICAL FIELD

The disclosed embodiments relate generally to image copping, and more particularly, to automatic image cropping.

BACKGROUND

Image cropping refers to the removal of certain areas of an image or group of images. For example, image frames of a video file may contain letterbox areas, i.e., top and bottom bands added to the image to preserve the image's original aspect ratio in widescreen. A user may wish to remove these bands from the video without impacting any picture areas of the image frames. To accomplish this, the user may manually determine the specific width of areas, if any, to crop from an image or a group of images. Such operations, however, require numerous instances of trial and error and may not guarantee accurate results. Accordingly, there is a need for the automatic determination of the areas, if any, to accurately crop from an image or group of images. In addition, where cropping is performed for a large group of images such as a video file, there is a need to determine crop values in a short amount of time without sacrificing accuracy.

SUMMARY

A computer-implemented method for cropping an image includes retrieving an image having a plurality of scan lines, each scan line having a plurality of pixels. The image is scanned from a first side to an opposing side to determine for each scan line an amount representing a degree of color variation among the pixels for that scan line. The amount determined for each scan line is then compared to a threshold value until a crop value for a first area of the image can be determined.

A computer readable storage medium stores one or more programs configured to be executed by a computer system. The one or more programs includes instructions for retrieving an image having a plurality of scan lines, each scan line having a plurality of pixels. The one or more programs also include instructions for scanning the image from a first side to an opposing side to determine for each scan line an amount representing a degree of color variation among the pixels for that scan line, and instructions for comparing the amount determined for each scan line to a threshold value until a crop value for a first area of the image can be determined.

A computer-implemented method for cropping a plurality of images includes retrieving a number of images to process among the plurality of images, and selecting an image from the plurality of images to determine a set of crop values for the image until the set of crop values for each image have been determined.

A system for automatically cropping a plurality of images includes means for enabling an automatic cropping feature, and means for retrieving a number of images to process among the plurality of images upon selection of the automatic cropping feature. The system also includes means for selecting an image from the plurality of images to determine a set of crop values for the image until the set of crop values for each image have been determined.

DESCRIPTION OF EMBODIMENTS

The disclosed embodiments describe ways to automatically and speedily determine the areas, if any, to accurately crop from an image or group of images, and cropping the image or group of images in accordance with those determinations. For example, in one mode of operation, this automatic cropping process performs statistical analysis on only a subset of image frames of a video file, and yet accurately determines crop values for the entire video file.

Figure 1:
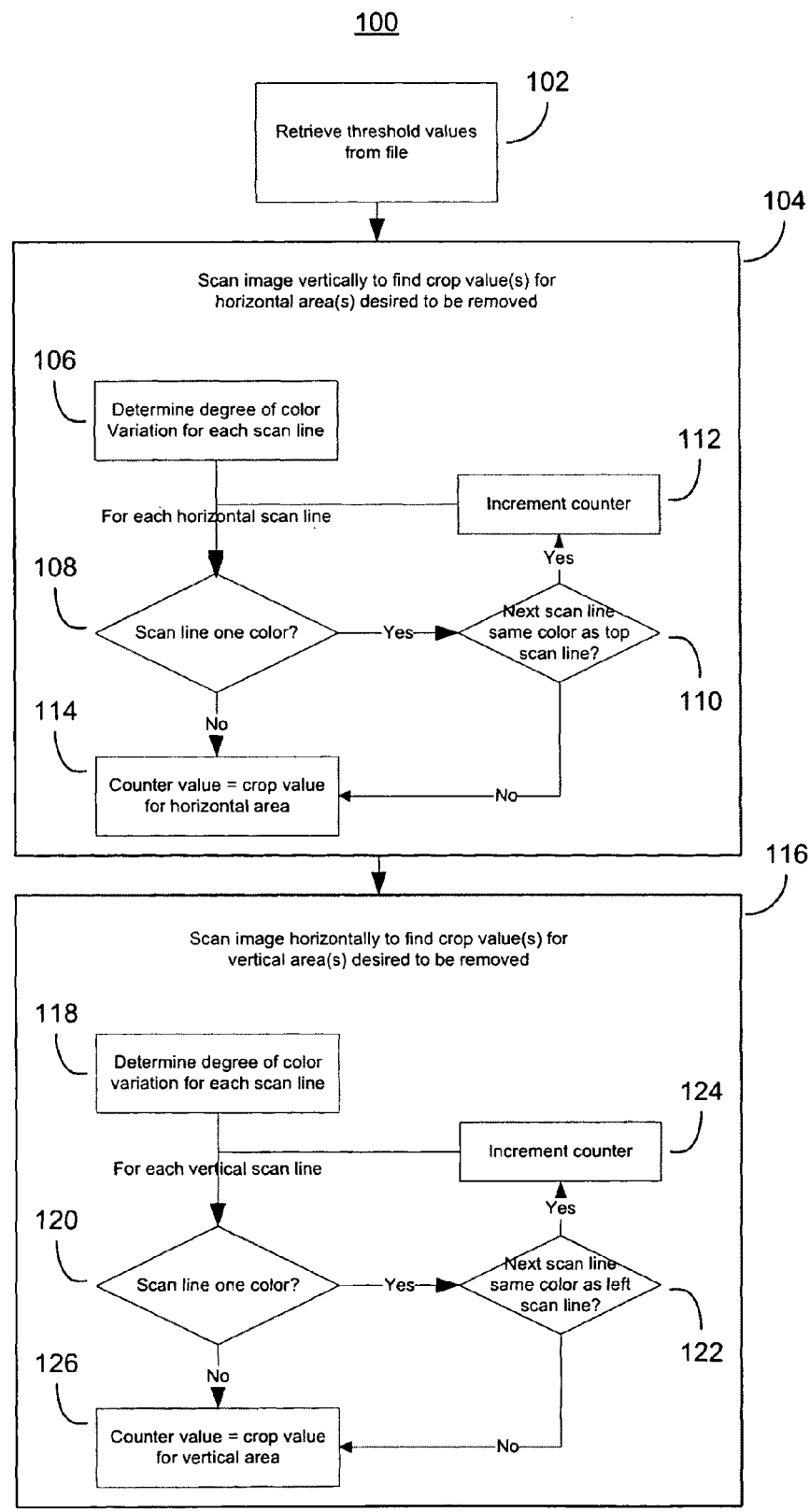
FIG. 1 is a flow diagram illustrating a process for automatically determining crop areas for an image, in accordance with a preferred embodiment of the present invention.

FIG. 1 is a flow diagram illustrating a process 100 for automatically determining crop areas for an image, in accordance with a preferred embodiment according to the present invention. Process 100 may be implemented by programs stored in a computer readable storage medium and configured to be executed by a computer system. Process 100 may be implemented using any type of instruction sets and executed by any type of computer system architectures. In some embodiments, for example, process 100 may be implemented using a floating point and integer SIMD instruction set, such as the AltiVec instruction set, and executed by a computer system designed using the PowerPC architecture. In some other embodiments, process 100 may be implemented using the SSE3 instruction set and executed by a computer system designed using the Apple-Intel architecture. In yet other embodiments, process 100 may be implemented in computer systems architectures that have neither enhancements as described above. Process 100 is designed to determine the areas to crop from an image in a simple and accurate manner, regardless of the type of architectures used to implement the process.

Process 100 operates on an image file that is represented digitally as a matrix of pixels. Color for each pixel may be described by a combination of three components, with each component storing a primary color intensity or some other basic color component value, depending on the particular color model used to represent the image. For example, if color for an image is represented by the RGB color model, a black pixel will be described as zeros for each of its primary color components red, green, and blue. If each pixel is allotted 24 bits of storage, a red pixel in this model will be described by 255, the maximum amount of color for its red component, and zeros for each of its green and blue components. Color for an image may also be described by other color models such as the CMY model, which uses the subtractive primary colors for its three components, or the YIQ model, which uses a luminance factor, an in-phase color, and a quadrature phase color for its three components. Other color models process 100 is designed to accommodate may include the HSL model, the HSV model, and any other types of color models known to those skilled in the art.

Each horizontal or vertical line of pixels in an image is referred to as a scan line. In some embodiments, process 100 operates on an image file that may contain letterboxes, i.e., top and bottom bands added to the image to preserve the image's original aspect ratio in widescreen. In some embodiments, process 100 also operates on an image file that may contain pillarboxes, i.e., vertical bands added to the image to preserve the image's original aspect ratio in a format not designed for widescreen. In some other embodiments, process 100 operates on an image file that does not contain letterboxes or pillarboxes, but may nevertheless contain areas that the user desires to remove. These areas include bands of one color or bands of various colors, as well as bands on the edge of the image or bands within other areas of the image. For example, an image may contain a rainbow colored horizontal band spanning from the second horizontal scan line from the top (e.g., a red scan line) to the eighth horizontal scan line from the top (e.g., a purple scan line). Because these areas span vertical or horizontal scan lines of an image, crop values may be represented by pixel increments in the vertical or horizontal directions.

To determine crop values for an image, several useful threshold values may be initially retrieved from file (102). These values may be selected by the user or may have already been pre-selected. These values may include, but are not limited to, a "user threshold" value and a "maximum color distance" value. In some embodiments, after retrieving the useful values, process 100 scans the image vertically to determine crop value(s) for horizontal area(s) of the image (104). Process 100 first scans the image from top to bottom, from bottom to top, or in some other order to determine the degree of color variation among the pixels for each scan line (106). For example, a mostly black or all red horizontal scan line will have a low degree of color variation among the pixels for that scan line, whereas a multi-colored scan line will have a higher degree of color variation among the pixels for that scan line. In some embodiments, process 100 determines the degree of color variation for each scan line by first finding a representative color for each scan line and then collecting sums of each scan line pixel's color distance from the representative color for that scan line.

The representative color for a scan line may be the average color for that scan line, which may in turn be represented by each of the average color components of that scan line. Given an image represented by the RGB color model, for example, the average color for a scan line would be represented by each of the average color components of that scan line in the following format: (average red, average blue, average green). Similarly, given an image represented by the CMY model, the average color for a scan line may be represented as: (average cyan, average magenta, average yellow). Average colors for scan lines of an image represented by one of the other color models may also be easily determined, for example, by using the mathematical formulas associated with those models.

In addition, operation 106 may collect the sums of each scan line pixel's color distance from the average color for that scan line. The variation of a pixel's color from another color may be represented by a distance in three-dimensional space. This distance is determined by the following equation:

$$\text{Distance}^2 = (\text{color}_x - \text{pixel}_x)^2 + (\text{color}_y - \text{pixel}_y)^2 + (\text{color}_z - \text{pixel}_z)^2$$

In some embodiments, each scan line pixel's color distance remains as "Distance$^2$" in the summation process. Doing so avoids having to add additional square root operations within operation 106. In some embodiments, process 100 finds a maximum sum among the sums collected for each horizontal scan line by operation 106.

Process 100 will then compare the degree of color variation determined for each horizontal scan line to a threshold value to determine whether each scan line consist mostly of one color (108). This threshold value represents the maximum amount of color variations allowed for a band of mostly one color. It may be a user controllable value, a preset value, or a combination of both. In some embodiments, the threshold value may not allow for any color variations at all. In some other embodiments, the threshold value may allow for a certain degree of color variations for a band of mostly one color. These color variations among the pixels of each scan line may be the result of factors, such as noise, introduced into the image file. For example, assuming that the RGB model is used, a pixel within a black band of an image file affected by noise may not have exactly zeros for each of its red, green, and blue components. In some embodiments, the threshold value is a percentage of the maximum sum found from the sums collected for each scan line in operation 106. In some embodiments, this percentage value can be a value initially retrieved from a file as described in operation 102.

Operation 106 will be repeated for each scan line until an appropriate crop value can be determined. In some embodiments, process 100 will perform operation 106 and an additional comparison until an appropriate crop value can be determined. This additional operation compares the representative color for each horizontal scan line to a representative color for a chosen horizontal scan line to determine whether an entire horizontal area consists mostly of one color (110). For example, a horizontal area may encompass a red scan line, followed by a yellow scan line, followed by a blue scan line. Thus, each scan line is of a single color, but the colors vary from scan line to scan line. Performing operation 108 on the scan lines will determine whether each scan line consists of mostly a single color, but performing the additional operation 110 using the top red scan line as the chosen scan line will determine whether all scan lines within that horizontal area are colored red. In some embodiments, the representative color for each horizontal scan line is the average color for that scan line. To compare each scan line's average color from the average color of the top or bottom scan line, a distance is found between the two colors using the same equation as described above. The distance may then be compared to a "maximum color distance" value to accommodate for factors such as noise. This "maximum color distance" value may initially be retrieved from file as described in operation 102. In some embodiments, horizontal area desired to be removed span top or bottom areas of the image. In that case, the chose scan line whose color is used for comparison may be the very first scan line of the image from the top or the very first scan line of the image from the bottom.

Operations 108 and 110 are performed for each horizontal scan line until a crop value can be determined for the desired area to be removed. The appropriate crop value may be represented by a counter, which becomes an incremented value each time operations 108 and/or 110 returns a positive comparison (112). The counter stops incrementing, however, when operations 108 and/or 110 returns a negative comparison. At that point, whichever value accumulated by the counter will then serve as the appropriate crop value for the desired area to be removed from that image.

In some embodiments, operations 108 and 110 may be repeated to find crop values for both a top band and a bottom band of the image. These top and bottom bands may be the top and bottom edges of a letterbox. For example, operation 108 and 110 may be performed to determine whether the top edge of the image encompasses multiple scan lines of mostly a single color, such as black. To determine the thickness of the top black band, if any, operations 108 and 110 are performed for each scan line from the top going towards the bottom. Assume that operation 108 has confirmed that the very first scan line from the top is mostly one color, and this color has been determined to be black. A counter at that instance will store an integer value "1," to indicate that the amount of area to be cropped is one horizontal scan line from the top of the image. Operation 108 then checks whether the color variation of each subsequent scan line is mostly one color by comparing the degree of color variation among the pixels of that scan line to a certain threshold. Operation 110 then compares the average color for each subsequent scan line against the color black, i.e., color for the very first scan line, to determine if these subsequent scan lines are mostly black as well. If both operations return positive comparisons for the next scan line, the counter is incremented to indicate that particular scan line is a part of the top edge to be cropped. At this instance, the counter will store the integer value "2." The process is repeated until any of the operations 108 or 110 returns negative comparisons. When a negative comparison is returned, whatever value stored in the counter at that instance will be the crop value for the top edge of the image. The same processes of repeating operations 108 and 110 can be performed to determine an appropriate crop value for the bottom edge of the image. The comparisons this time can be performed for each scan line from the bottom going towards the top, using the average color for the bottom most scan line as the chosen scan line in the comparison of operation 110.

In some embodiments, process 100 may also scan the image horizontally to determine crop value(s) for vertical area(s) of the image (112). Similar to operation 106 described above, process 100 may scan the image from left to right, right to left, or in some other order to determine the degree of color variation among the pixels for each vertical scan line (114). Similar to operations 108 and 110 described above, process 100 then compares the degree of color variation for each scan line to a threshold value and/or compare the color of each scan line to the color of a designated scan line until a desired crop value can be determined (116 and 118). For example, to find the crop value for a dark band spanning the left edge of an image, operations 116 and 118 can be performed iteratively in the same way as operations 108 and 110. Assume that operation 116 has already determined that the leftmost scan line is of mostly one color, and that the color is black. Assume also that a crop value counter is currently zero. For each subsequent scan line going to the right of the image, operation 116 checks whether the scan line consist mostly of one color, and operation 118 checks whether that scan line is the same color as the leftmost scan line. If both operations return positive comparisons, then the counter is incremented to lengthen the width of the area to be cropped. This process is repeated until either one of the operations 116 or 118 returns a negative comparison. In some embodiments, operations 116 and 118 may be additionally performed to determine a crop value for the right side of the image, using the rightmost scan line as the designated scan line in the comparison of operation 118.

In some embodiments, either or both of the horizontal or vertical scan operations 104 and 116 can be performed. For example, given an image that may be letterboxed or pillarboxed, both horizontal and vertical operations 104 and 116 can be performed to determine the width of the bands, if any, to remove. In addition, horizontal and vertical scan operations 104 and 112 can be performed one before the other, or vice versa.

In some embodiments, process 100 operates on an image frame of an overall video file containing a multitude of image frames. For example, a one-minute video file having a frame rate of 25 frames-per-second ("fps") would contain at least 1500 image frames and a one-minute video file having a frame rate of 30 fps would contain at least 1800 image frames. To avoid having to perform operation 100 repeatedly on all 1500 or 1800 image frames for a mere one-minute video, operation 100 may be performed for only a selected number of image frames. For example, if a movie appears as letterboxed throughout, only one set of crop values needs to be determined to remove the letterboxes from each image frame containing that letterbox. Process 100 does not need to be repeated for every single image frame of that movie.

Figure 2:
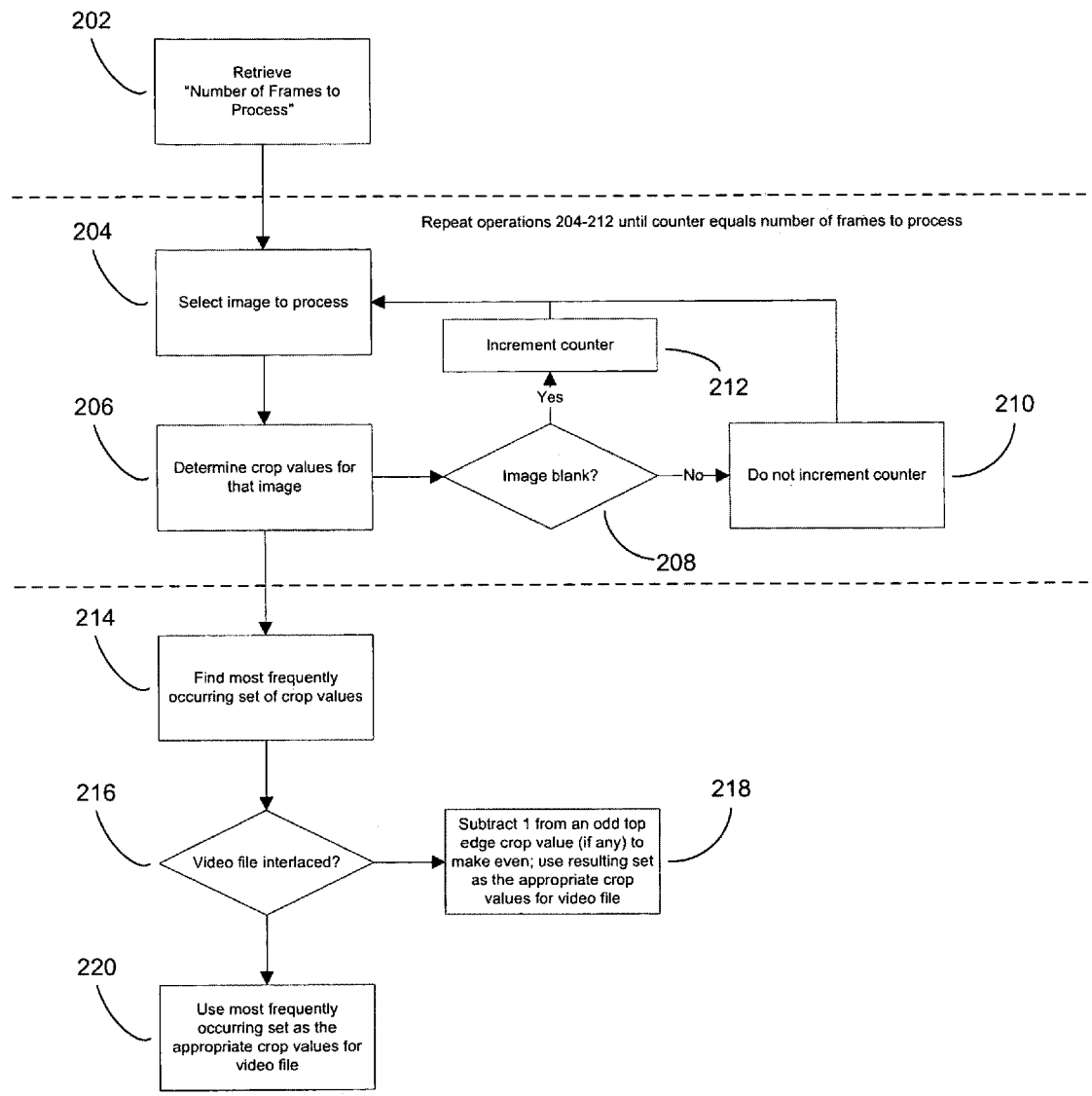
FIG. 2 is a flow diagram illustrating a process for automatically determining crop areas for a video file, in accordance with a preferred embodiment of the present invention.

FIG. 2 is a flow diagram illustrating a process 200 for automatically determining crop areas for a video file, in accordance with another preferred embodiment of the present invention. Process 200 may initially retrieve a value indicating the number of frames to process (202). This value may be selected by the user or may have already been pre-selected. If the number of frames of the actual video file is less than the number of frames indicated by the value, then the "Number of Frames to Process" value can be set to the actual number of frames in the video file. After determining the number of frames to process, process 200 selects an initial image frame from the multitude of image frames (204). In some embodiments, the image frame is selected randomly rather than in consecutive order. In a video file containing pillarboxed content located throughout the later frames of the file, consecutively selecting an early group of frames to process may not accurately determine the amount of pillar areas to remove. In some embodiments, the image frame is selected in a random progression order. For example, process 200 first divides the entire video file into as many parts as the "Number of Frames to Process." Assume the video file has 1000 image frames and the "Number of Frames to Process" equals 10. The video file will be divided into 10 parts, each part containing 100 image frames. Process 200 then randomly selects a first image frame from the first part containing 100 image frames. Process 200 then randomly selects a second image frame from the range starting with the position number of the first selected image frames and ending with the next 100 image frames. Next, process 200 randomly selects a third image frame from the range starting with the position number of the second selected image frames and ending with the next 100 image frames, and so forth.

Next, statistical analysis is performed on the selected image frame to determine a set of crop values for that image (206). In some embodiments, the statistical analysis is configured to determine crop values for all four edges of an image. In an image frame containing pillarboxed content, for example, the set of crop values returned for that image might be zero pixel increments for the top and bottom edges, and five pixel increments for the left and right edges. Once a set of crop values has been determined for a particular frame, an image frame counter will be incremented (212). If the set of crop values returned indicate that the particular image frame is blank, that image may be discounted and the counter will not be incremented (208 and 210). Operations 204-212 repeats until the frame counter equals the "Number of Frames to Process," and crop values have been determined for each of the selected frames to process.

In some embodiments, process 200 may choose a set of crop values that occurs most frequently among the sets of crop values determined for each selected and processed image frame (214). This most frequently occurring set of crop values will then be the set of crop values used to crop the entire video file (220). If there are more than one set of crop values occurring most frequently, process 200 may choose the set of crop values that indicates the least amount of image removal. In some embodiments, process 200 operates on an interlaced video file in which each single image is represented by two frames $\frac{1}{60}^{th}$ of a second apart (assuming that the video frame rate is 30 fps) (216). One frame consists of all the odd horizontal scan lines for an image, and the other frame consists of all the even horizontal scan lines for the same image. These "half" frames are interlaced together throughout the video. Assume that a crop value is found for a horizontal area at the top edge of each frame, and assume that the value is an odd integer such as five. Removing the first five scan lines from the top of the odd frame for an image will cause the remaining horizontal scan lines of that frame to start at an even number. Thus, for interlaced videos, process 200 may subtract one from this odd numbered crop value so that the correct order of interlacing will not be disturbed (218).

In some embodiments, process 200 may be used as part of the adjustable geometry settings needed for transcoding video files in a video compression application. For example, the adjustable geometry settings may include a crop feature that allows the user either to manually select the amount of areas to crop or to allow the application to automatically detect the appropriate amount. In some embodiments, the compression application detects whether a source video file has been letterboxed or pillarboxed and enters the appropriate edge values to crop in the transcoded file. In some embodiments, an user can access these adjustable settings in a geometry pane interface included in the application.

Figure 3:
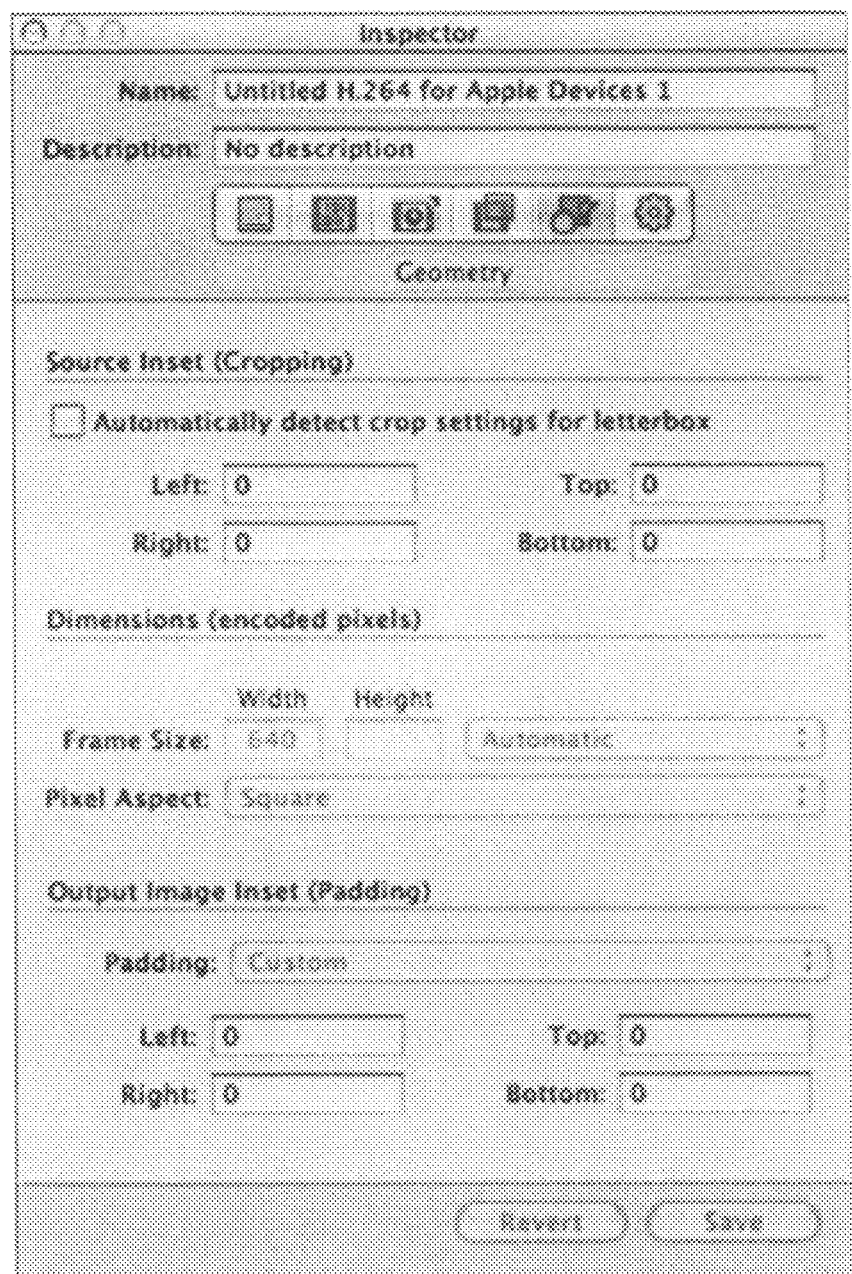
FIG. 3 is a schematic screenshot illustrating a geometry pane, in accordance with a preferred embodiment of the present invention.

FIG. 3 is a schematic screenshot illustrating a geometry pane, in accordance with a preferred embodiment of the present invention. The geometry pane includes a "Source Inset (Cropping)" section in which the user can enter left, right, top, and bottom pixel increments to crop from the source video file. The "Source Inset (Cropping)" section also includes a checkbox to allow the application to automatically detect whether there are any areas to crop from the source video file, and if so, to remove those areas according to the detected settings.

The foregoing description, for purpose of explanation has been described with reference to specific embodiments. The illustrative discussions above, however, are not intended to be exhaustive or to limit the invention to the precise forms disclosed. Many modifications and variations are possible in view of the above teachings. The embodiments were chosen and described in order to best explain the principles of the invention and its practical applications, to thereby enable other skilled in the art to best utilize the invention and various embodiments with various modifications as are suited to the particular use contemplated.

What is claimed is:

1. A computer-implemented method using a computer system for cropping a plurality of images, comprising:
    retrieving a number N of images to process among the plurality of images;
    selecting an image from the plurality of images to determine a set of crop values for the image until the set of crop values for N images have been determined;
    finding at least one frequently occurring set of crop values among the set of crop values determined for the N images; and
    cropping the plurality of images with the at least one frequently occurring set of crop values,
    wherein the computer system performs at least one of the retrieving, selecting, finding, or cropping.

2. The computer-implemented method of claim 1, wherein selecting an image from the plurality of images, further comprises randomly selecting an image from the plurality of images.

3. The computer-implemented method of claim 2, wherein randomly selecting an image from the plurality of images, further comprises selecting the image in a random progression order.

4. The computer-implemented method of claim 2, wherein the plurality of images are interlaced.

5. The computer-implemented method of claim 4, wherein an odd crop value is subtracted to become an even crop value.

6. The computer-implemented method of claim 1, further comprising finding more than one frequently occurring set of crop values among the set of crop values determined for the N images and choosing the set of crop values having lowest values.

7. The computer-implemented method of claim 6, wherein the chosen set of crop values is used to crop all of the plurality of images.

8. The computer-implemented method of claim 1, wherein the image includes a plurality of scan lines, each scan line including a plurality of pixels, and the determining the set of crop values for the image includes scanning the image from a first side to an opposing side to determine for each scan line an amount representing a degree of color variations among pixels for that scan line, and comparing the amount determined for each scan line to a threshold value until a crop value can be determined.

9. A system for automatically cropping a plurality of images comprising:
    means for enabling an automatic cropping feature;
    means for retrieving a number N of images to process among the plurality of images upon selection of the automatic cropping feature;
    means for selecting an image from the plurality of images to determine a set of crop values for the image until the set of crop values for N images have been determined;
    means for finding at least one frequently occurring set of crop values among the set of crop values determined for the N images; and
    means for cropping the plurality of images with the at least one frequently occurring set of crop values.

10. The system of claim 9, wherein selecting an image from the plurality of images, further comprises randomly selecting an image from the plurality of images.

11. The system of claim 10, wherein randomly selecting an image from the plurality of images, further comprises selecting the image in a random progression order.

12. The system of claim 10, wherein the plurality of images are interlaced.

13. The system of claim 12, wherein an odd crop value is subtracted to become an even crop value.

14. The system of claim 9, further comprising means for finding more than one frequently occurring set of crop values among the set of crop values determined for the N images and choosing the set of crop values having lowest values.

15. A non-transitory computer readable storage medium comprising instructions, the instructions causing a computer to execute the steps of:
    retrieving a number N of images among a plurality of images;
    selecting an image from the plurality of images to determine a set of crop values for the image until the set of crop values for N images have been determined;
    finding at least one frequently occurring set of crop values among the set of crop values determined for the N images; and
    cropping the plurality of images with the at least one frequently occurring set of crop values.

16. The non-transitory computer readable storage medium of claim 15, wherein selecting an image from the plurality of images, further comprises randomly selecting an image from the plurality of images.

17. The non-transitory computer readable storage medium of claim 16, wherein randomly selecting an image from the plurality of images, further comprises selecting the image in a random progression order.

18. The non-transitory computer readable storage medium of claim 16, wherein the plurality of images are interlaced.

19. The non-transitory computer readable storage medium of claim 18, wherein an odd crop value is subtracted to become an even crop value.

20. The non-transitory computer readable storage medium of claim 15, further comprising finding more than one frequently occurring set of crop values among the set of crop values determined for the N images and choosing the set of crop values having lowest values.

* * * * *